United States Patent
Bartels

(10) Patent No.: US 6,648,415 B2
(45) Date of Patent: Nov. 18, 2003

(54) AUTOMOBILE SEAT BACK WITH HEIGHT-ADJUSTABLE HEADREST

(75) Inventor: Sven Bartels, Genthin (DE)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 10/300,242

(22) Filed: Nov. 20, 2002

(65) Prior Publication Data

US 2003/0107253 A1 Jun. 12, 2003

(30) Foreign Application Priority Data

Dec. 12, 2001 (DE) .......................... 101 60 929

(51) Int. Cl.[7] ............................................. B60N 2/48
(52) U.S. Cl. ................. 297/391; 297/440.1; 297/440.21
(58) Field of Search .......................... 297/391, 410, 297/440.1, 440.16, 440.21

(56) References Cited

U.S. PATENT DOCUMENTS

| | | | | | |
|---|---|---|---|---|---|
| 3,512,833 A | * | 5/1970 | Sugiura | ...................... | 297/410 |
| 3,904,241 A | * | 9/1975 | Makinen | ..................... | 297/391 |
| 4,390,209 A | * | 6/1983 | Izuno et al. | ................. | 297/410 |
| 4,527,834 A | * | 7/1985 | Zyngier | ...................... | 297/410 |
| 4,674,796 A | * | 6/1987 | Weinich et al. | ............. | 297/391 |
| 4,695,095 A | * | 9/1987 | Faust et al. | ................. | 297/410 |
| 4,844,545 A | * | 7/1989 | Ishii | ........................... | 297/410 |
| 5,397,170 A | * | 3/1995 | Shrock | .................. | 297/452.18 |
| 5,927,813 A | * | 7/1999 | Nemoto | ...................... | 297/391 |

FOREIGN PATENT DOCUMENTS

| | | | | |
|---|---|---|---|---|
| DE | 3642415 | 6/1988 | ......................... | 1/6 |
| DE | 19516988 | 11/1995 | ...................... | 2/48 |
| DE | 19728618 | 1/1999 | ....................... | 7/38 |
| DE | 69512212 | 9/1999 | ....................... | 2/48 |

* cited by examiner

Primary Examiner—Peter R. Brown
(74) Attorney, Agent, or Firm—Bourque & Associates, P.A.

(57) ABSTRACT

A height-adjustable headrest for a seat back of an automobile includes support rods that transfix guide areas attached to the seat back frame. The ends of the support rods positioned below the guide areas are connected with a bracket so that they may ratchet, and may be separated from it by pulling upward. At least the end of one the the support rods is locked in its first position by the bracket against extraction upward, and, in a second position, the support rod may be displaced only by means of a tool so that it may be extracted upward.

16 Claims, 6 Drawing Sheets

AUTOMOBILE SEAT BACK WITH HEIGHT-ADJUSTABLE HEADREST

TECHNICAL FIELD

The invention relates to a headrest for an automobile seat back and more particularly, the a head rest having at least one support rod that cannot be removed by simply pulling upward but rather, requires a tool for extraction of the headrest.

BACKGROUND INFORMATION

In a conventional seat back, both headrest support rods are mounted to a connecting bridge positioned below the rod guides so that it may ratchet, with which, for example, a drive for motorized height adjustment may engage. The support rods may be extracted from the connecting bridge with increased effort in order to remove the headrest from the seat back.

A seat back with height-adjustable headrest is also known in DE 695 12 212 T2 in which at least one of the support rods includes notches into which a manually-operable, spring-tensioned lock engages. When the lock is pressed against the tensioning spring, the headrest height may be adjusted, or the headrest support rods may be extracted from their guides.

Such a removable property is convenient, but includes the danger that the headrest may be removed unnecessarily and that the seat may be used without the headrest in place.

Based on this state of the art, it is the task of this invention to make removal of the headrest so difficult that it cannot be performed by hand.

The solution of this task results from the characteristics of Patent claim 1.

SUMMARY OF THE INVENTION

The present invention discloses a height-adjustable headrest for a seat back of an automobile includes support rods that transfix guide areas attached to the seat back frame. The ends of the support rods positioned below the guide areas are connected with a bracket so that they may ratchet, and may be separated from it by pulling upward. At least the end of one the support rods is locked in its first position by the bracket against extraction upward, and, in a second position, the support rod may be displaced only by means of a tool so that it may be extracted upward.

The headrest height may be adjusted throughout its range in the normal fashion. Removal is prevented by an additional locking device that may be released only by the use of an actuation element separate from the headrest, such as a tool.

The present invention discloses a height-adjustable headrest for use with a seat back of an automobile seat having a seat frame, comprising first and second support rods (3; 4), that transfix guide areas (1a) affixed to the seat frame (1) of the seat back. The ends of the first and second support rods (3; 4) which are positioned below the guide areas (1a) are connected with a bracket 5 so that they may ratchet, and so that they may be released from above.

At least the end of said second support rod (4) in a first locking position is interlocked with the bracket (5) against extraction from above, and wherein in a second unlocking position the second support rod (4) may be displaced only by means of a tool to extract it from above.

Advantageous embodiments of the invention result from the dependent claims. In one advantageous embodiment, the headset is unlocked by rotating one of the support rods by means of an open-end wrench applied to the rod. The locking device is constantly held in its locked position by a spring so that unintentional removal of the headrest is prevented.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
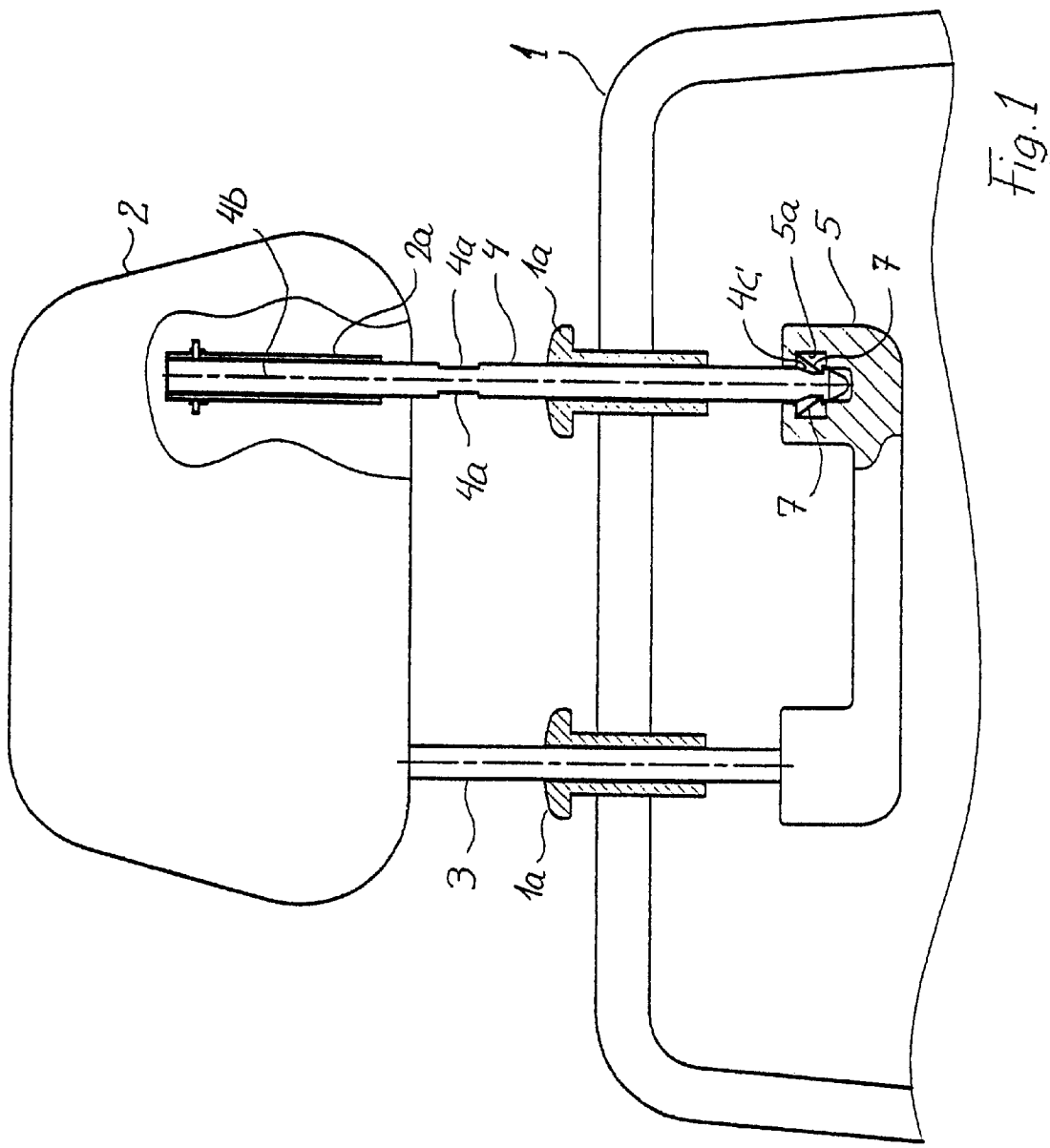
FIG. 1 is a schematic illustration of a seat back with a height-adjustable headrest in accordance with the present invention, in partial cutaway view.

A headrest 2, FIG. 1, is mounted by means of support rods 3 and 4 so that the height is adjustable on the seat back of which only part of the back frame 1 is shown in FIG. 1. The support rods 3 and 4 are inserted into guide areas 1a that are configured as guide shells. The guide areas 1a are firmly attached to the seat back frame 1.

The two support rods 3 and 4 are connected together at their lower ends by a bracket 5 which serves as a connecting bridge 5.

For motorized height adjustment, the adjusting drive engages in a manner not shown with the bracket 5. The headrest 2 is thus held in its height-adjusted position by the internal friction of the drive.

During manual height adjustment, a ratcheting element may be provided in the conventional manner in one of the guide areas that engages with the ratcheting recesses covering the height-adjustment area on one of the support rods.

Figure 2:
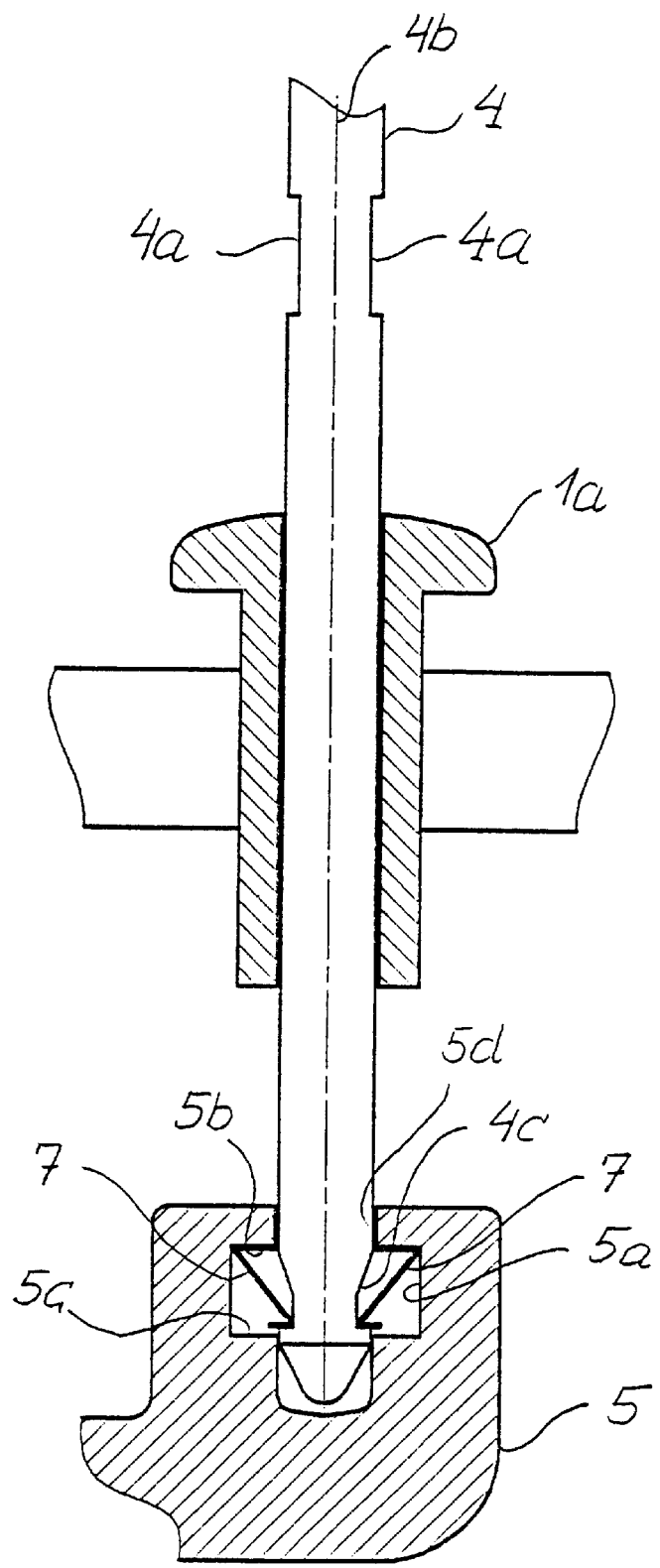
FIG. 2 is a cutaway view of a support rod according to the present invention inserted into the seat back as shown in FIG. 1 in locked position.

The support rod 3 is engaged with the bracket 5 so that it may be generally easily removed. It may be separated from the bracket 5 by pulling it, and may be reinstalled using simple pressure. The support rod 4 is in turn locked with the bracket 5. For this, support rod 4 includes notches 4c opposing each other on its lower end, into which generally Z-shaped leaf springs 7 engage that are positioned in a receiver aperture 5d for the snap ring groove 5a surrounding the support rod 4. The leaf springs 7 rest on the one side on a support surface 5b in the snap ring groove 5a, and, in locked condition of the headrest as shown in FIG. 2, against the strike surface 4d arising from the notch 4c. In this position, the support rod 4 may not be removed from the bracket 5, so that removal of the headrest is not possible.

Figure 5:
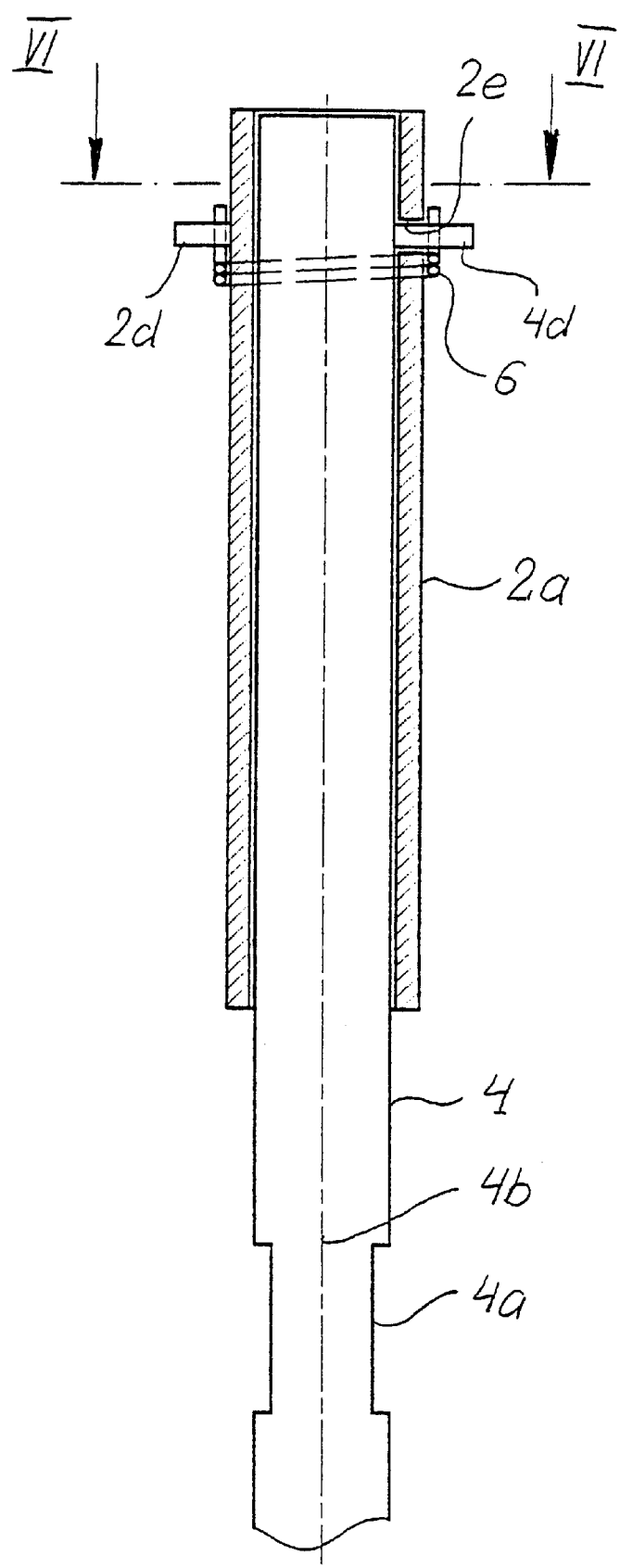
FIG. 5 is a cutaway view of the upper area of the support rod within the headrest as in FIG. 1.
Figure 6:
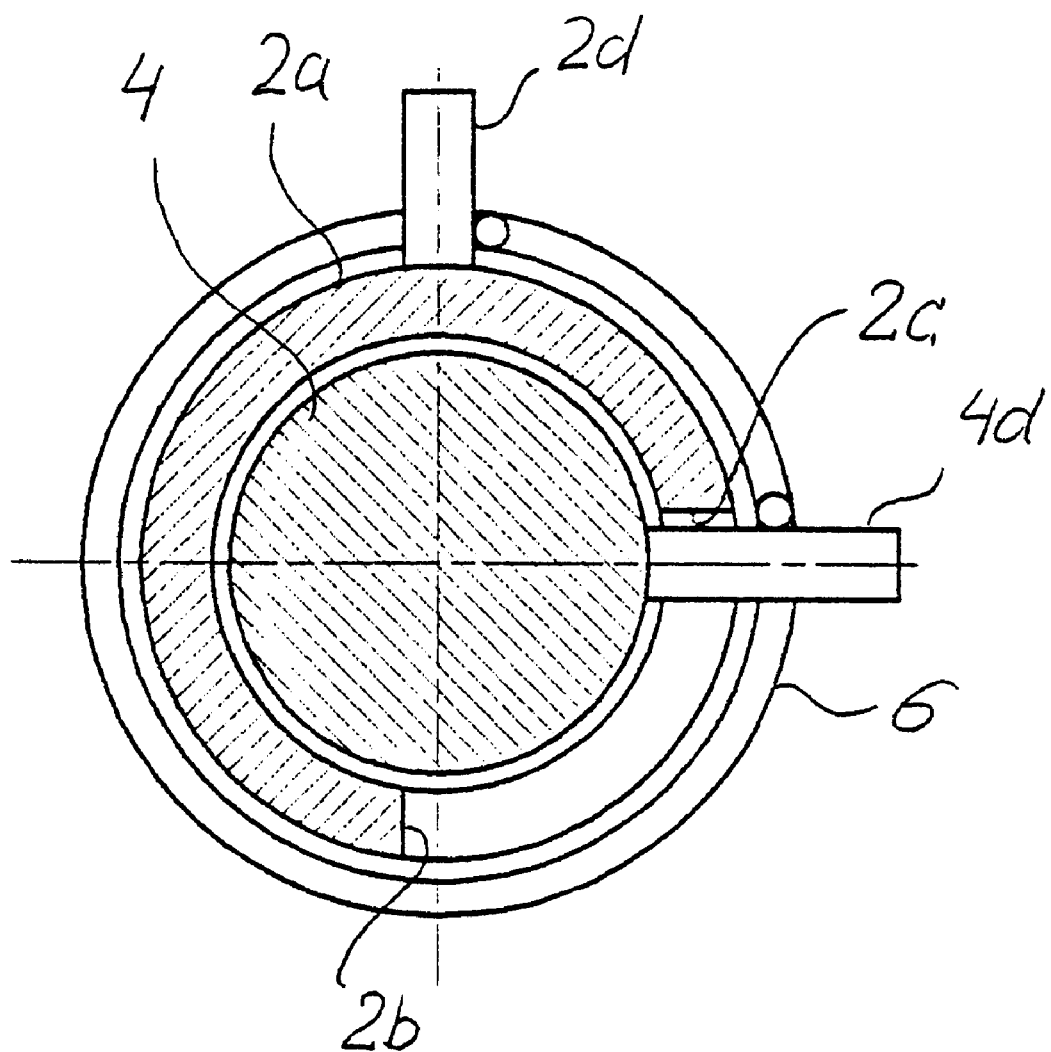
FIG. 6 is a cross-section through the support rod along lines VI—VI in FIG. 5.

As FIG. 5 shows, the support rod 4 is mounted in a support shell 2a firmly connected with the headrest 2 so that it may rotate. The support rod 4 includes an area 4d formed as a strike pin firmly connected with the support rod, that transfixes the support shell 2*a* through a guide slot 2*e* extending over a part of its circumference. The narrow sides of the guide slot 2*e* form strike points 2*b* and 2*c* to limit the rotational motion of the support rods 4. An end of the return spring 6 rests against the area 4*d* fixed with the support rod 4 that holds the fixed area 4*d* against the rest 2*b*. The other end of the return spring 6 rests against the area 2*d* fixed to the support shell 2*a*.

Figure 3:
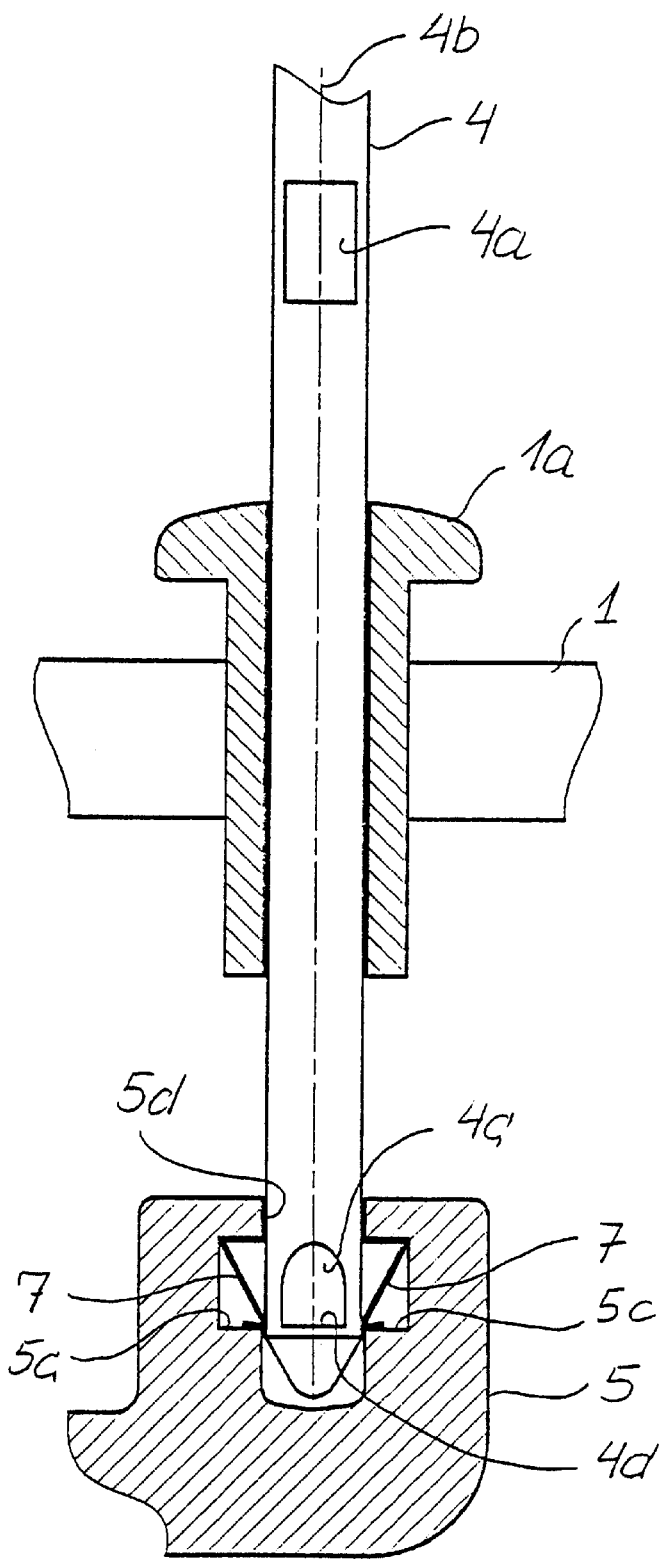
FIG. 3 is a cutaway view as in FIG. 2 with a support rod in accordance with the present invention in an unlocked position.
Figure 4:
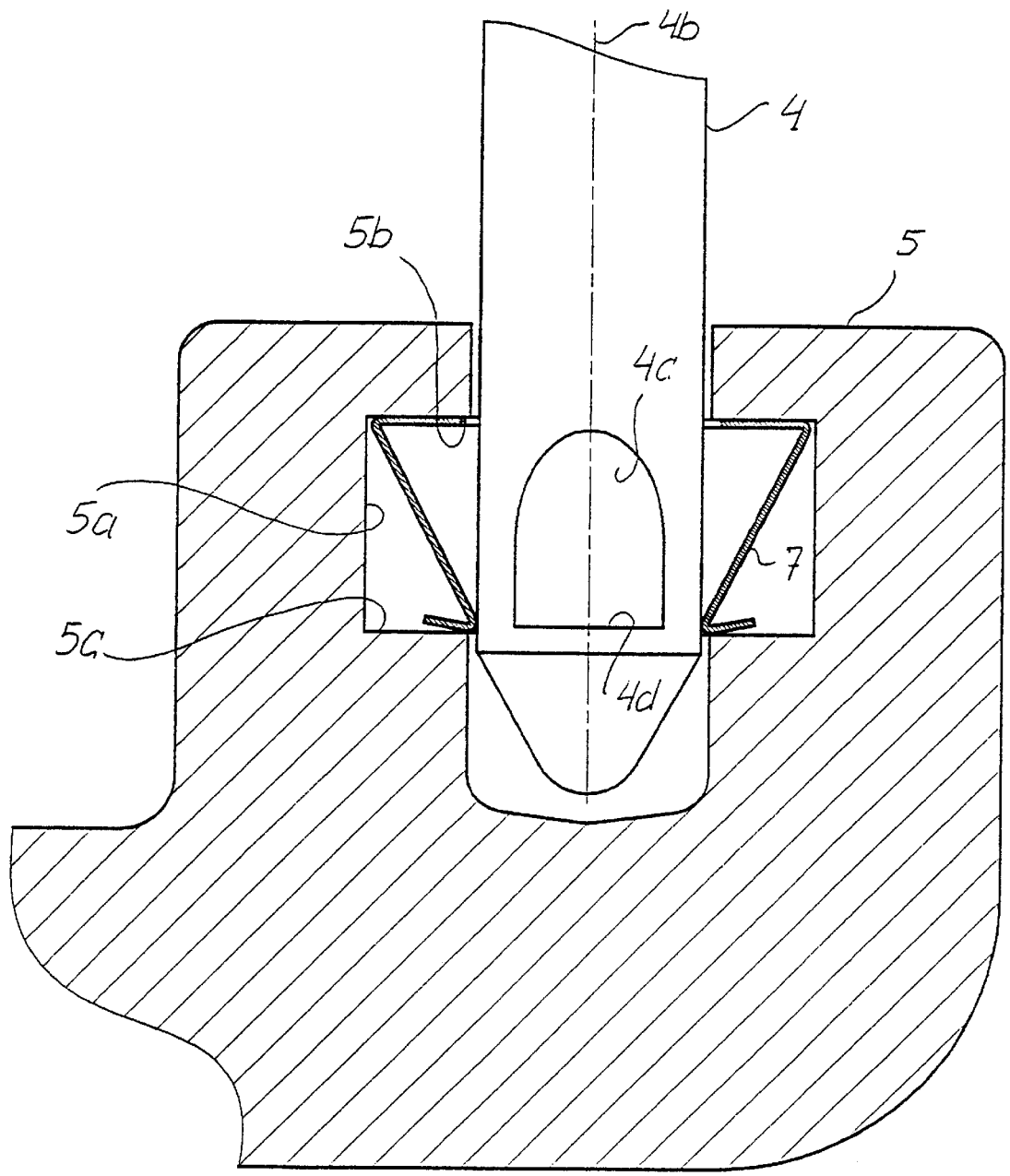
FIG. 4 is an enlarged view of the locking area as shown in FIG. 3.

In the constantly-accessible area between the support shell 2*a* and guide area 1*a*, the support rod 4 includes flat gripping surfaces 4*a* extending on opposing sides parallel to each other in the direction of the longitudinal axis 4*b* of the support rod 4. The gripping surfaces 4*a* serve as actuation surfaces for the rotation of the support rod 4 against the force of the return spring 6, e.g., by means of a wrench. When the support rod 4 is rotated, the leaf springs 7 in FIGS. 3 and 4 are pressed apart so that the support rod 4 may be extracted from the receiver opening 5*d*.

After the support rod 4 has been extracted, the short flanks of the leaf spring 7 are deflected into the receiver opening 5*d* so that they grip the strike surface 4*d* upon reinsertion of the support rod 4. The leaf springs 7 thus rest with their short flanks against the sidewall 5*c* of the snap ring groove 5*a*. The support rod 4 is thus locked against the holding device 5. Tension exerted against the support rod 4 is transferred via the leaf springs 7 to the bracket 5 so that the support rods 3 and 4 may be displaced only jointly with the bracket 5 in the direction of the longitudinal axis 4*b*.

Modifications and substitutions by one of ordinary skill in the art are considered to be within the scope of the present invention which is not to be limited except by the claims which follow.

What is claimed is:

1. A height-adjustable headrest for use with a seat back of an automobile seat having a seat frame, comprising:
   a first and a second guide each adapted to be secured to the seat frame of the seat back, said first and said second guide each having a cavity;
   a first and a second support rod disposed through said cavity within said first and said second guides, whereby a first end of the first and second support rod positioned below the first and the second guides connected with a bracket so that said first end may rotate relative there to, wherein at least the first end of said second support rod includes means for engaging said bracket having a first position whereby said second support rod is interlocked with the bracket against vertical extraction and a second rotated position whereby said second support rod may be removed from said bracket only by means of a tool.

2. The height-adjustable headrest as in claim 1, wherein the bracket is a connecting bridge between the first and second support rods.

3. The height-adjustable headrest as in claim 1, wherein the first and the second positions are rotated with respect to each other about the longitudinal axis of the second support rod.

4. The height-adjustable headrest as in claim 1, wherein the guides are circular-cylinder shells whose inner diameter generally match an outer diameter of the circular cylindrical support rods.

5. The height-adjustable headrest as in claim 1, wherein the upper end of the second support rod is mounted to the headrest so that it may swivel about longitudinal axis.

6. The height-adjustable headrest as in claim 5, wherein the upper end of the second support rod is positioned within a support shell affixed to the headrest.

7. The height-adjustable headrest as in claim 1, wherein the second support rod includes a gripping surface between the underside of the headrest and the second guide area for a tool to rotate the second support rod.

8. The height-adjustable headrest as in claim 7, wherein the gripping surface is formed by two flat actuation surfaces parallel to each other and to the longitudinal axis.

9. The height-adjustable headrest as in claim 1, further including a return spring that grips the second support rod for self-actuated swiveling of the second support rod out of the second position into the first position.

10. The height-adjustable headrest as in claim 9, wherein the first and second positions are defined by corresponding striking surfaces.

11. The height-adjustable headrest as in claim 9, wherein the return spring is a flanked spring whose one flank rests against an area fixed with a support shell affixed to said headrest, and whose other flank rests against an area fixed to the second support rod.

12. The height-adjustable headrest as in claim 1, wherein said second support rod includes a locking end, and wherein the locking end of the second support rod includes a striking surface extending at least approximately perpendicular to the longitudinal axis that extends over only a portion of the circumference of the support rod.

13. The height-adjustable headrest as in claim 12, wherein said second support rod includes two opposing and mutually-aligned striking surfaces.

14. The height-adjustable headrest as in claim 12, wherein the striking surface is shaped to receive an end of a leaf spring tensioned radially inward.

15. The height-adjustable headrest as in claim 14, wherein the leaf springs are Z-shaped in longitudinal cross-section and have first and second ends, and wherein the leaf springs thus rest proximate one end against a strike surface of the snap ring groove surrounding the second support rod, and proximate the second end in an unlocked condition against a side wall of the snap ring groove parallel to the strike surface.

16. The height-adjustable headrest as in claim 12, wherein the striking surface is part of a notched area.

* * * * *